United States Patent
Larsen et al.

(10) Patent No.: US 8,708,244 B2
(45) Date of Patent: Apr. 29, 2014

(54) CONTROL OF A SYSTEM WITH A LARGE THERMAL CAPACITY

(75) Inventors: Lars Finn Sloth Larsen, Sydals (DK); Honglian Thybo, Soenderborg (DK); Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 1158 days.

(21) Appl. No.: 12/278,195

(22) PCT Filed: Feb. 8, 2007

(86) PCT No.: PCT/DK2007/000064
§ 371 (c)(1),
(2), (4) Date: Dec. 5, 2008

(87) PCT Pub. No.: WO2007/090405
PCT Pub. Date: Aug. 16, 2007

(65) Prior Publication Data
US 2009/0222145 A1 Sep. 3, 2009

(30) Foreign Application Priority Data
Feb. 10, 2006 (DK) .................................. 2006 00198

(51) Int. Cl.
*F24D 5/10* (2006.01)
(52) U.S. Cl.
USPC ............. 237/69; 700/299; 700/300; 126/567; 126/561; 126/562; 122/448.1; 122/20 R; 165/289; 165/290
(58) Field of Classification Search
USPC ............. 237/69; 700/299, 300; 165/290, 289; 122/20 R, 448.1; 126/562, 561, 567
See application file for complete search history.

(56) References Cited

U.S. PATENT DOCUMENTS

| 1,930,456 | A | * | 10/1933 | Rumble | ..................... 122/479.1 |
| 2,559,198 | A | * | 7/1951 | Ogden | ............................ 237/69 |
| 4,393,527 | A | * | 7/1983 | Ramey | .......................... 126/562 |

(Continued)

FOREIGN PATENT DOCUMENTS

| DE | 2545797 | 10/1975 |
| DE | 10057359 A1 | 5/2002 |

(Continued)

OTHER PUBLICATIONS

JP 09287752, Nov. 4, 1997, English machine translation.*

(Continued)

*Primary Examiner* — Kang Hu
*Assistant Examiner* — Phillip E Decker
(74) *Attorney, Agent, or Firm* — McCormick, Paulding & Huber LLP

(57) ABSTRACT

The invention provides a method and a system for controlling floor heating or climate regulating systems with long time constants. According to the invention, a flow of a fluid is provided through the floor or through a similar medium with large thermal inertia. An induced heat is determined by adding up a plurality of differences between an inlet temperature of the fluid when it enters the medium and an outlet temperature of the fluid when it leaves the medium. The temperatures are sampled with a fixed sampling time and within a fixed period of time, and a corresponding change in temperature of the medium over the fixed period of time is determined. In the future, the temperature of that medium is controlled by use of a ratio between the induced heat and the change in temperature.

6 Claims, 14 Drawing Sheets

(56) References Cited

U.S. PATENT DOCUMENTS

| | | | | |
|---|---|---|---|---|
| 4,702,306 A | * | 10/1987 | Herzog | 165/295 |
| 4,711,162 A | * | 12/1987 | Eriksson | 454/263 |
| 4,865,120 A | * | 9/1989 | Shiroki | 237/69 |
| 6,062,485 A | * | 5/2000 | Stege et al. | 237/2 A |
| 6,533,186 B2 | | 3/2003 | Neve et al. | |
| 7,069,976 B2 | * | 7/2006 | Lindgren | 165/292 |
| 7,311,264 B2 | * | 12/2007 | Franke et al. | 165/287 |
| 7,685,830 B2 | * | 3/2010 | Thybo et al. | 165/244 |
| 7,905,100 B2 | * | 3/2011 | Thybo et al. | 62/129 |
| 8,121,734 B2 | * | 2/2012 | Larsen et al. | 700/276 |
| 2003/0089119 A1 | * | 5/2003 | Pham et al. | 62/131 |
| 2008/0114500 A1 | * | 5/2008 | Hull et al. | 700/300 |
| 2008/0296010 A1 | * | 12/2008 | Kirchberg | 165/294 |
| 2009/0154520 A1 | * | 6/2009 | Richner et al. | 702/136 |

FOREIGN PATENT DOCUMENTS

| | | | | |
|---|---|---|---|---|
| EP | 0955503 | A2 | 11/1999 | |
| GB | 1553268 | | 9/1979 | |
| JP | 03156241 | A * | 7/1991 | F24F 11/02 |
| JP | 8-272458 | A | 10/1996 | |
| JP | 9287752 | A | 11/1997 | |
| JP | 10-246448 | A | 9/1998 | |
| JP | 2002-156345 | A * | 5/2002 | |
| JP | 2003269733 | A | 9/2003 | |
| JP | 2006-17408 | A | 1/2006 | |

OTHER PUBLICATIONS

Thybo et al, Control of a water-based floor heating system, Oct. 1-3, 2007, 16$^{th}$ IEEE International Conference on Control Applications.*

Thybo et al, Control of a water-based floor heating system, Oct. 1-3, 2007, 16th IEEE International Conference on Control Applications.*

International Search Report for PCT/DK2007/000064 dated Jul. 31, 2007.

International Search Report of PCT/DK2007/000064 dated Jul. 31, 2007.

Jin et al, KR 2006055808 A English abstract, May 2006.

Mikio, JP 09-287752 A English machine translation, Nov. 1997.

* cited by examiner

CONTROL OF A SYSTEM WITH A LARGE THERMAL CAPACITY

CROSS REFERENCE TO RELATED APPLICATIONS

This application is entitled to the benefit of and incorporates by reference essential subject matter disclosed in International Patent Application No. PCT/DK2007/000064 filed on Feb. 8, 2007 and Danish Patent Application No. PA 2006 00198 filed Feb. 10, 2006.

TECHNICAL FIELD

The present invention relates to a method for controlling a thermally convective system in which fluid exchanges thermal energy with a medium. The invention further relates to a heat exchanger, convector or heated floor which is controlled in accordance with the method. In particular, the invention relates to a method of controlling a thermally convective system with large thermal capacity and thus with large time constants.

The invention is applicable for controlling any kind of system in which a fluid exchanges thermal energy with a medium and may provide a considerable benefit in systems with a large time constant. As an example of such a system, the following description of the invention is mainly focused on floor heating systems. Alternatively the invention may be applied for controlling temperatures of an ice rink, a swimming pool or any other system with large time constants.

BACKGROUND OF THE INVENTION

Floor heating becomes more and more popular in domestic heating. Normally, such a system comprises a pipe which circulates water in a loop between a receiving portion in which the water is enriched with thermal energy and a delivering portion in which the thermal energy is delivered firstly to a floor and secondly to the ambient space. The receiving portion normally connects to, or forms part of a traditional heating system, e.g. an oil or gas fired central heating boiler while the delivering portion is normally embedded in a concrete floor construction or in similar heavy floor constructions with a large thermal capacity which thereby effects large time constants of the heating system.

There are several ways to control the thermal convection of existing floor heating systems. Traditionally, the circulated water flows with a fixed speed and a fixed supply temperature. A valve is inserted in the loop to control the amount of water which is passed through the floor. In a more advanced system, the floor comprises a loop which is isolated from the remaining heating system, and which is capable of controlling the temperature of the water which enters the floor. In other systems, the pipe is divided into separate segments with valves enabling control of the flow of water through the segments individually. The control action is typically initiated based on an observed temperature difference between an actual temperature and a desired temperature of an ambient space.

Due to the large thermal inertia, it takes relatively long time before system settings have an effect on the temperature of the floor and even longer time before the settings have an effect on the temperature of the ambient space—i.e. the room temperature. The systems are therefore difficult to control. As a consequence, an environment which is exposed to varying climatic conditions typically experience varying temperatures. As a consequence, the system causes too high heating costs and unsatisfactory climatic conditions.

Floor heating is increasingly applied in floors made from materials which are sensitive towards large temperature variations and high temperatures, e.g. wood. The control must therefore be carried out with increased precaution, and many existing systems are therefore operated with a relatively low water temperature, e.g. in the range of 30 degrees Celsius. This, however, leads to further increased time constants, and often makes it impossible to counteract sudden climatic changes. Similar problems exist in other heating and cooling systems with relatively large time constants, e.g. in connection with heating of swimming pools or cooling of ice rinks.

BRIEF DESCRIPTION OF THE INVENTION

It is an object to improve the existing thermally convective systems, in particular systems with a large inertia such as floor heating systems, e.g. for providing improved comfort, less temperature variations and improved economy. Accordingly, the invention, in a first aspect, provides a method wherein an induced heat is determined by adding up a plurality of differences between an inlet temperature of the fluid when it enters the medium and an outlet temperature of the fluid when it leaves the medium. The temperatures are sampled with a fixed sampling time within a fixed period of time. A change in temperature of the medium determined over the fixed period of time, and a control constant which defines a ratio between the induced heat and the change in temperature is provided for the system in question, i.e. the ratio defines an aggregate of temperature differences which leads to a specific raise in the temperature of the medium, e.g. a raise of one degree Celsius, i.e. a sum of temperature differences between the inlet temperature and outlet temperature when sampled with the fixed sampling time. The fixed sampling time specifies that the temperatures are measured with a fixed frequency, e.g. every second, every tenth second or every minute within the fixed period of time. The fixed period of time could be a period of 1-10 or even 100 minutes.

By means of the ratio, a specific temperature of the medium may be achieved merely by measuring the inlet temperature and outlet temperature of the water and without having to wait for the temperature of the medium to rise. Accordingly, the temperature of the medium may be controlled without the drawback caused by a large thermal inertia of the medium itself. As an example, a certain temperature of a floor may be desired. Once the floor is made, a ratio for that specific floor is determined by an initial experiment carried out in accordance with claim 1. The subsequent continuous control of the floor heating may be carried out in accordance with claim 2, i.e. an actual floor temperature is measured and a change in temperature required to reach the desired temperature is determined. The flow of water through the floor is initiated while an inlet temperature and an outlet temperature are determined with the fixed sampling time which was used during the initial experiment. By means of the ratio, the value of the aggregated temperature differences which leads to the desired change in temperature is determined. As an example, the desired change is a temperature raise of 4 degrees Celsius, and the ratio specifies an aggregated temperature difference of 2500 with a sampling time of 1 second for obtaining a one-degree raise in temperature. Accordingly, the 4 degrees require an aggregated temperature difference of 10000. While hot water is circulated in the floor heating system, samples of the inlet temperature and outlet temperature are taken for every 1 second, and the differences are added up until 10000 is reached. At this point, circulation of water is cancelled, and the delivered thermal energy is allowed to spread into the floor whereby the desired 4 degrees raise in temperature should be achieved after a period of time.

When a fluid with a temperature which is different from the temperature of a solid floor is introduced into a conduit of the floor, the thermal energy of the fluid spreads from the fluid into the floor. In a first period of time, the thermal energy is conducted through the solid floor, e.g. through a solid block of concrete which surrounds the conduit. In this period of time, the thermal energy spreads essentially equally in all directions perpendicular to an outer surface of the conduit. In a subsequent period of time, i.e. when the spreading of the thermal energy has reached an outer boundary of the solid floor, e.g. the upper surface of the floor, the energy is transmitted to the surrounding atmosphere. When the thermal energy is conducted through the solid material, the thermal energy spreads fast, and the temperature of the fluid decreases rapidly. When the thermal energy is transmitted to another medium, e.g. the air surrounding the floor, the thermal energy spreads less fast, and the temperature of the fluid decreases much more slowly. In this subsequent period of time, the thermal energy spreads faster through solid concrete than through a transition into another medium. Accordingly, the shift between the first period of time and the subsequent period of time is easily recognisable by surveillance of the temperature of the fluid in the conduit.

In a second aspect, the invention provides a method of determining a floor temperature of a solid floor by using the above observation. According to this method a conduit of the floor is filled with a fluid having a temperature which is different from the temperature of the floor. Subsequently, a fixed point in time at which thermal energy is no longer transmitted equally in all directions perpendicular to an outer surface of the conduit is determined. Subsequently, the temperature of the fluid in the conduit is determined. For the purpose of climate control, this temperature is typically sufficiently close to the temperature of the floor itself and can therefore be used for controlling the climate of the environment of the floor. The invention therefore, in a third aspect provides a method of controlling room temperature of a heated or cooled environment, said method being characterised in that the room temperature is controlled based on a temperature of the floor which temperature is found by the method of the second aspect.

The conduit could be filled with a fluid which is hot or cold relative to the floor, but the temperature difference between the water and the floor may preferably be at least 10 degrees Celsius or even more.

In one particular embodiment of the method, hot water is circulated through a pipe which is embedded in a floor which is cold relative to the hot water. When the hot water has passed all the way through the pipe, i.e. when a large increase in temperature is registered at the outlet of the pipe, the circulation is stopped. As a consequence of thermal convection between the water in the pipe and the cold solid concrete, the temperature of the water drops relatively fast. The speed at which the temperature drops, i.e. degrees Celsius per time unit is however declining. At a certain point in time the speed at which the temperature drops has been reduced e.g. to 50 pct of the speed at which the temperature of the fluid dropped when the circulation of the water was stopped. It is an object of the invention to select the fixed point in time based on the speed at which the temperature of the water drops. As such, the fixed point in time could be when the speed is 50 pct. of the initial speed when loading of hot water is stopped.

BRIEF DESCRIPTION OF THE DRAWINGS

In the following, a preferred embodiment of the invention will be described in further details with reference to the drawing in which.

DETAILED DESCRIPTION

Figure 1:
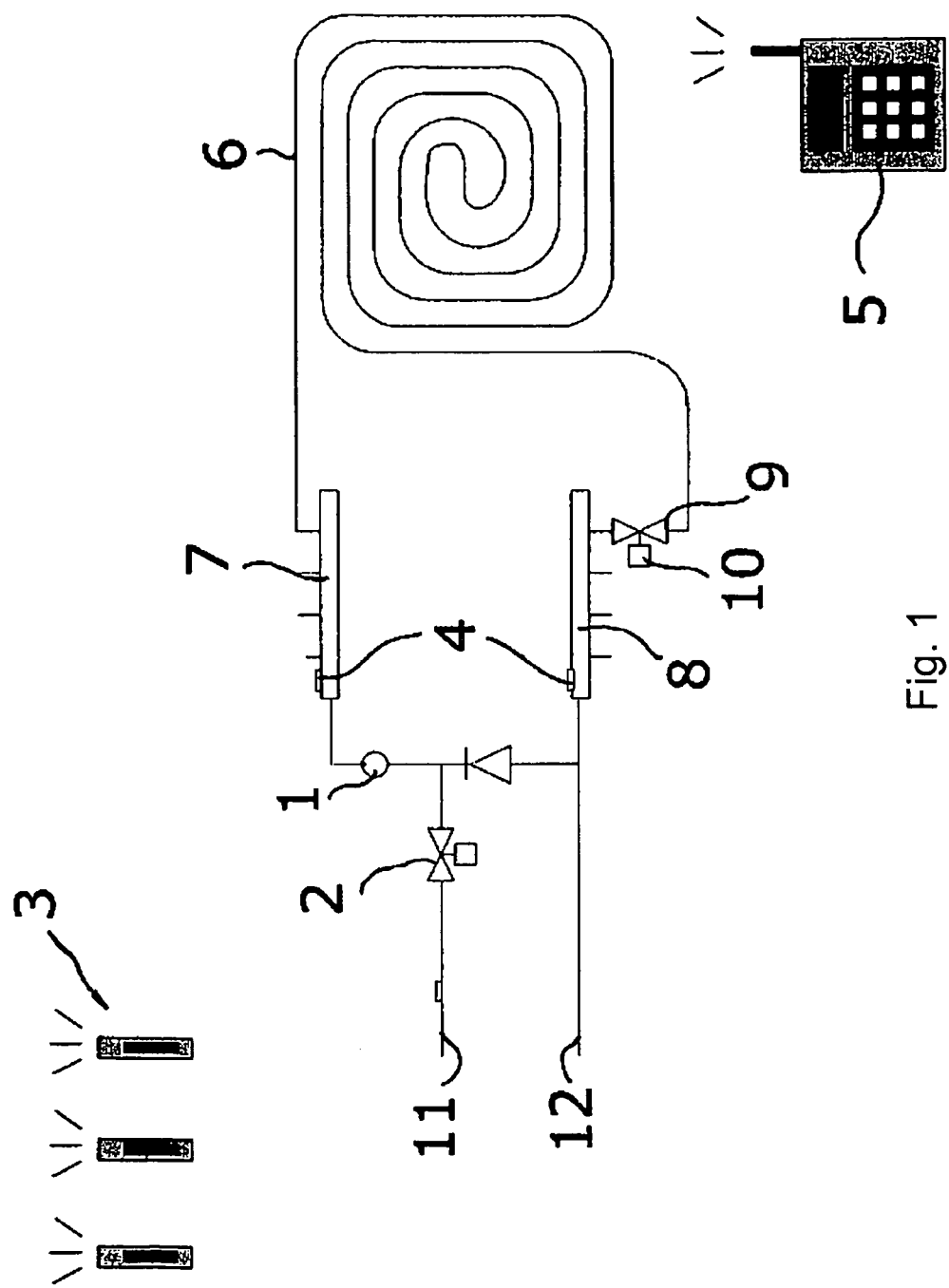
FIG. 1 shows a layout of an experimental setup.

The following detailed description contains the nomenclature:
$\dot{Q}$ energy flow
$\dot{M}$ mass flow
$C_P$ specific heat capacity
$\Delta T$ temperature difference between inlet and outlet water
$T_{in}$ inlet temperature
$T_{out}$ outlet temperature
h sampling time A system setup with a floor heating system as indicated in FIG. 1 is established. The floor heating system is mainly made up of several water loops, a circulation pump 1, motor controlled valves 2, wireless air temperature sensors 3, water temperature sensors 4, and a controller 5. FIG. 1 illustrates one of the loops 6, i.e. a floor heating system for one room. In this heating system, the inlet and outlet water temperature are measured by water temperature sensors 4 which are mounted on the manifolds 7, 8 and which are accessed by the controller 5. The room air temperature, floor temperature and outdoor temperature are measured by temperature sensors 3 (e.g., DANFOSS® wireless temperature sensors) which are placed inside the room and can be accessed through serial interfaces. The water flow is provided by a circulation pump 1 (e.g., GRUNDFOS® UPE circulation pump) or by a similar pump which produces a constant differential pressure and thereby provides a constant flow in the loop 6. The water circulation valve 9 is controlled by a servomotor 10 which receives control signals from the controller 5. The water is received from a hot water inlet pipe 11 and returned to a water outlet pipe 12. In order to obtain direct control of the concrete temperature, all components of the system are controlled by the controller 5. The optimal action of the control system depends greatly on the temperature of the very large concrete mass because the actual transferred heat is delivered by the difference between the concrete temperature and the air temperature in the room. Hence, with a hot concrete lump, one should be very concerned with temperature overshoots.

Figure 2:
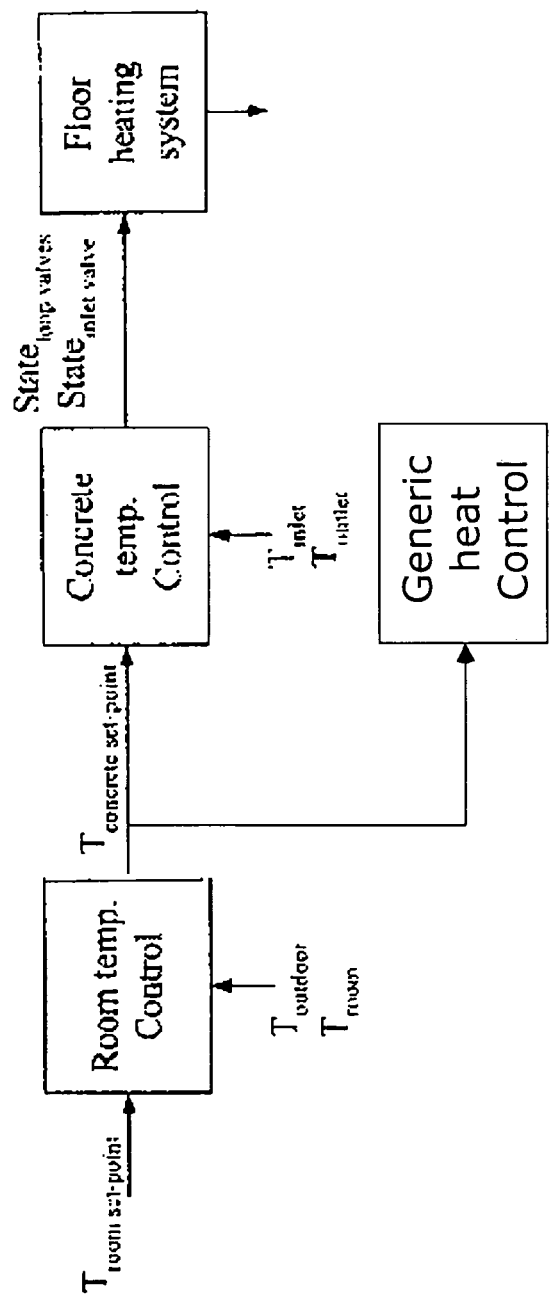
FIG. 2 schematically illustrates a control strategy for a floor heating system.

The control problem is firstly divided into two, i.e. into an inner loop keeping the concrete temperature at a desired level and an outer loop providing a set-point for the concrete temperature based on external conditions, c.f. FIG. 2

If more heat sources are available, the room temperature control can utilize these in parallel directly because the setpoint of the concrete temperature control can be seen as a heat reference as $$\dot{Q}_{floor} = K(T_{concrete} - T_{room})\qquad\text{Equation 1}$$

Likewise, the other heating sources can be given their share of the required heating as heat production references, e.g.

$$\dot{Q}_{total} = \dot{Q}_{floor} + \dot{Q}_{source1} + \dot{Q}_{source2}$$

where source 1 could be a traditional radiator and source 2 could be a very swiftly reacting heat blower, i.e. with a very short time constant.

The aim of the concrete temperature control is to provide fast and accurate control of the concrete temperature. A main problem is that the temperature is not uniform in the concrete mass and no feasible solution for a concrete temperature sensor is available. We propose to apply a control scheme that provides a sequence, where the concrete temperature can be estimated through the outlet water temperature. After the concrete temperature is obtained, a heating sequence can be initiated. Because it takes a long time to obtain a concrete heat estimate, it is desirable to have a long cycle time. Hence it is proposed to calculate how much heat we need to add to the concrete to achieve the set-point and then add the calculated amount before initiating an estimation phase. The control loop can then be described as

---

Estimation phase: Wait the estimation period
Concrete temperature estimate = Outlet temperature
Heating phase: Wanted Heat=(Setpoint−Concrete temperature estimate)*Cp
While Wanted heat>Applied heat{
Open Inletvalve
Applied heat= Applied heat+
(inlet − outlet temperature)*sampling time}
Close InletValve
Applied heat = 0
Return to Estimation phase

---

The described control cycle assumes that we have a heat capacity (Cp) for the concrete floor. This is generally not the case, but it seems reasonable to assume that the heat capacity is constant, so we can design an experiment to obtain an estimate of the heat capacity, which is discussed in the following.

Estimating the Concrete Temperature

Figure 3:
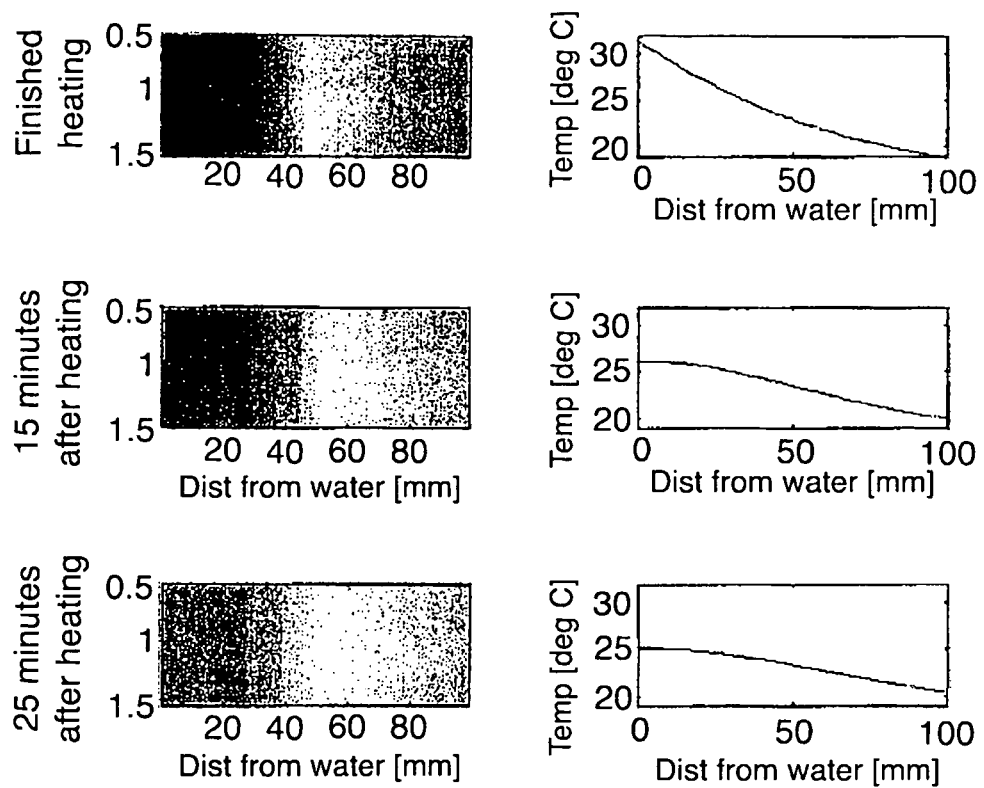
FIG. 3 shows a simulation of the temperature gradient during a heating and equalizing phase for a 10 cm concrete block.

Assuming no heating has been applied for a while after a heating burst. Then the temperature gradients of the concrete slowly decrease towards a uniform temperature. The hot water in the concrete will slowly decrease in temperature until it reaches the concrete temperature. FIG. 3 shows a simulation of the temperature gradient during a heating and equalizing phase for a 10 cm concrete block. The simulation assumes a heating element is attached to the left side of the concrete block with an initial temperature of 20° C. In particular, FIG. 3 illustrates the slow heat equalization after a heating sequence using 60° C. water for 40 minutes.

Using the water temperature 15 minutes after heating as estimation temperature, this example gives an estimated temperature of 26° C. When observing the temperature distribution just after heating, it can be seen that the estimated temperature of 26° C. corresponds to measuring at a distance of 30 mm from the heat source. The concrete further away than 30 mm have a lower temperature at all times during heating and equalizing. The mean temperature of the concrete will then be lower than the estimate because a heat gradient still remains.

Estimating the Heat Capacity

The purpose of the experiment is to obtain an estimate of the heat capacity by inducing heat in the concrete of the investigated room and observe the temperature increase of the concrete. The heat capacity can be calculated as $$Cp = \frac{\Delta Q_{water}}{\Delta T_{concrete}},\qquad\text{Equation 2}$$

$$\Delta Q = \int_0^t \dot{Q}(t) = \int_0^t \dot{m}(t)Cp\Delta T(t)dt\qquad\text{Equation 3}$$

By assuming constant flow and time discretizing the integral we get $$\Delta Q = K\sum_{i=0}^{k}(T_{in}(i*h) - T_{out}(i*h)),\qquad\text{Equation 4}$$

where $$K = \dot{m}Cph\qquad\text{Equation 5}$$

and where h is the sample time of the i'th interval, i.e. k*h=t.

Figure 4:
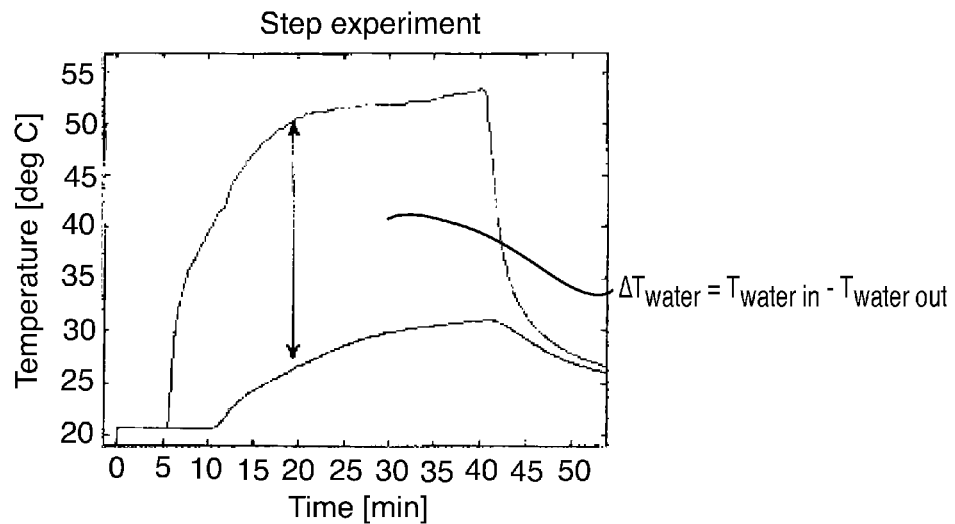
FIGS. 4-6 illustrate results of a step experiment conducted to obtain a heat capacity estimate.

FIG. 4 illustrates a heat induction experiment, where the circulation of only the investigated room was enabled, while the hot water inlet valve was opened for 40 minutes. The water temperature in the inlet of the room loop ($T_{water\ in}$), and the water temperature in the room loop outlet are displayed.

Figure 5:
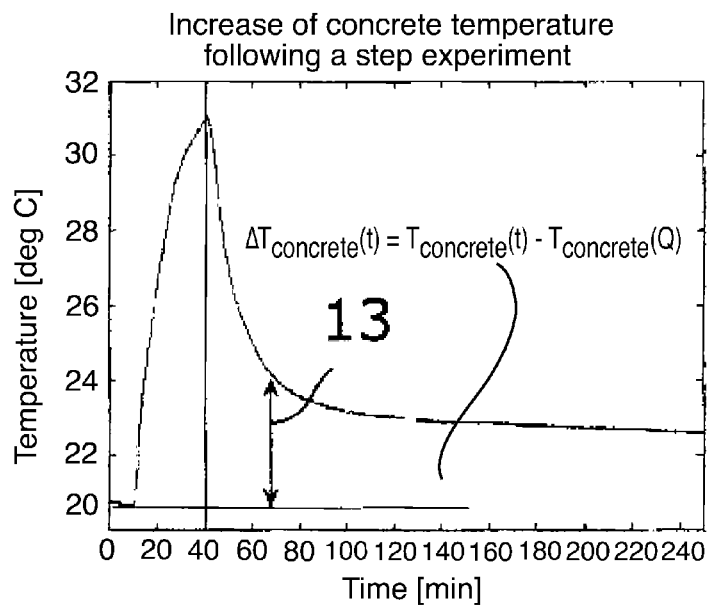
Figure 6:
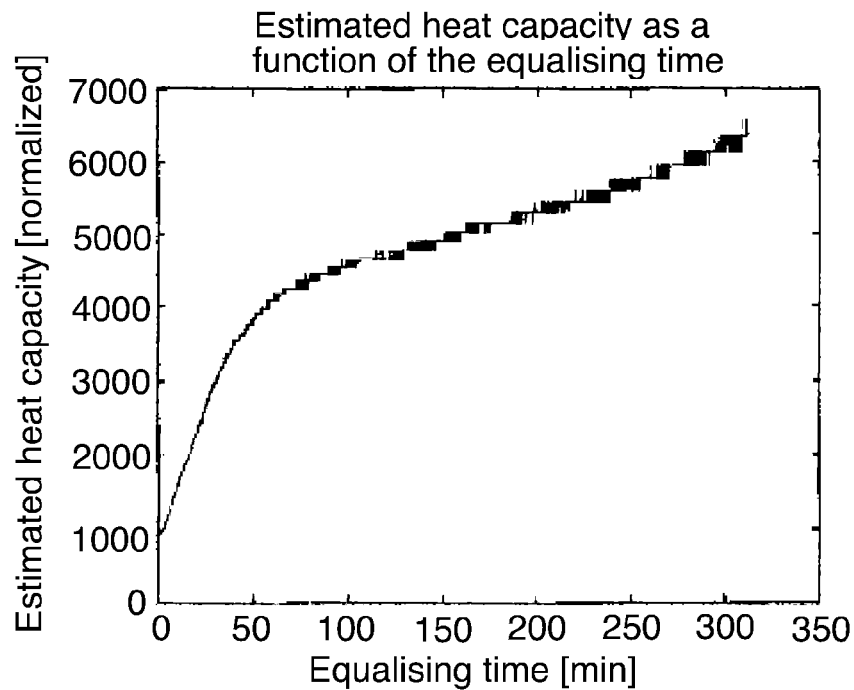

FIG. 6 shows the heat capacity estimate, calculated by Equation 2, as a function of time. It shows that the temperature has not equalized, which also can be seen on FIG. 5. Hence the obtained estimate produces a too high value as long as the concrete has not equalized totally. Heat transfer to the surroundings could also contribute to the latter part of the profile, but experiments performed in steady-state shows a much lower decrease in temperature.

Equation 2 assumes a uniform concrete temperature. The problem is however that it takes a long time to get a uniform temperature profile in the concrete material after heating. The heating process initiates a radiant temperature gradient centered at the heating pipes, which equalizes very slowly.

Figure 7:
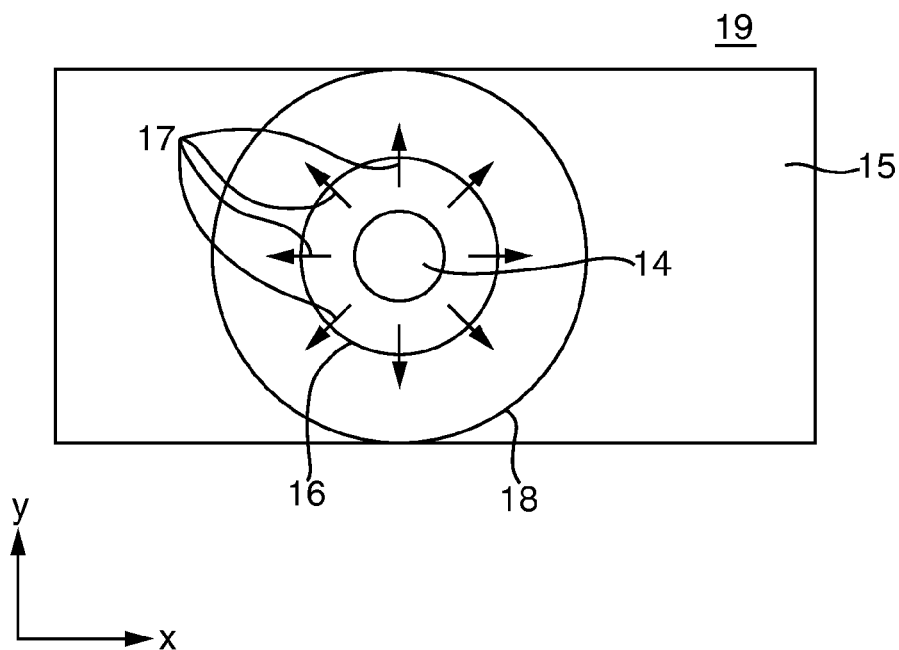
FIG. 7 illustrates a cross-section of a concrete floor construction with an embedded pipe.

FIG. 5 shows the temperature of the circulated water after the heating cycle. A rapid decrease of the water temperature can be seen the first 20 minutes after heating is terminated. At a certain point in time, indicated by the double arrow 13, the temperature decrease becomes slower and almost linear in the following time. This can be explained by the shape of the concrete floor. In the initial phase after the heating, the thermal energy spreads equally in radial directions from the pipe, but after the heat reaches the upper and lower part of the concrete, the heat is mainly distributed towards the sides while the distribution of the thermal energy in directions towards the surface of the floor is reduced. As a result, the energy flow is reduced significantly. This phenomenon can be utilised for determining a floor temperature of a concrete floor with a conduit embedded in the floor. According to this method a conduit in a concrete floor is filled with a hot fluid, the point in time at which the decrease becomes much more slowly, in the following referred to as a fixed point, is found. At this point in time the speed at which the temperature of the fluid decreases has been reduced e.g. to less than 50 pct, such as to less than 25 pct. of a speed at which the temperature of the fluid decreased at the time when the loading of hot water into the pipe was stopped. At a point of time after the fixed point in time, i.e. to the right of the double arrow 13, the temperature of the water is measured, and the floor temperature is approximately the same. The method is illustrated by the following experiment in which hot water is loaded into a loop formed by a pipe 14, c.f. FIG. 7, which pipe is embedded in a concrete floor construction 15. An outlet temperature of the water when it leaves the concrete floor is shown by the graph in FIG. 8.

At the beginning, i.e. at time 0, hot water enters into the system. Since it takes a period of time for cold water in the pipe to run out of the pipe, the outlet temperature starts increasing at time a. From the time difference from time 0 to time a and the flow speed of the water, we can approximate the length of the pipe 14.

When the hot water valve is closed, the outlet temperature will start dropping after a short period of time. This period depends on the flow speed and the length of the pipe. Point b, shown in FIG. 8 indicates when the temperature starts dropping.

Figure 8:
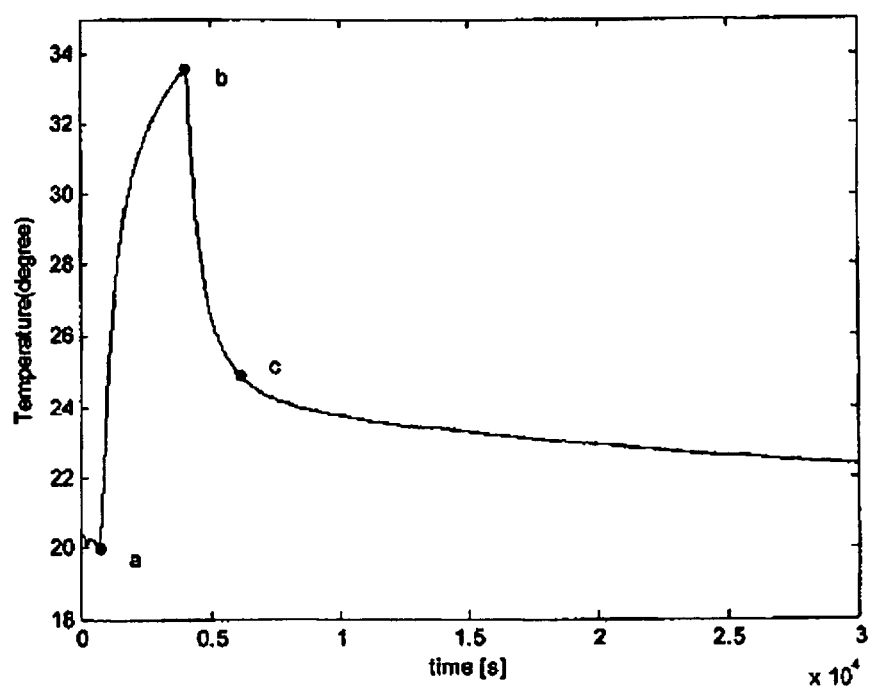
FIG. 8 illustrates variations in the outlet temperature during a period of time.

In a first period of time from b to c, the outlet temperature drops relatively fast. In this period of time, the thermal energy is transmitted in all directions through a solid concrete block. The circle 16 indicates a distance from the pipe 14 which the thermal energy has reached. Since the energy is transmitted in a solid block of concrete, the energy is transmitted equally in all directions perpendicular to an outer surface of the conduit, this is indicated by the arrows 17 which are of equal length. In a second period of time after point c, the temperature drops relatively slowly until a steady state concrete temperature is reached. The second period of time starts when the thermal energy reaches the distance indicated by the circle 18 from the pipe 14. In this second period of time, less energy is transmitted in the y-direction, c.f. the coordinate system in FIG. 7, the reason being that the transmission in this direction takes place through a transition from solid concrete to the surrounding atmosphere at the surface 19 of the floor. In FIG. 8, the first period of time is indicated from b to c, and the second period of time is after point c. Since the transmission of a part of the thermal energy takes place at a lower speed, the inclination of the graph is smaller after point c than before point c.

The following description explains the invention in further details:

I INTRODUCTION

Water-based floor heating systems have during the recent years been increasingly used. The reason why floor heating systems are preferred is mainly due to the increased comfort of having a warm floor (e.g. in bathrooms) and a more uniform temperature distribution in the heated room (due to the large heat transmitting surface i.e. the floor).

A typical water-based floor heating system consists of a circulation pump that maintains the required flow of heated water to casted-in water pipes in the floors of the heated rooms. In particular, each floor can be divided into a top-floor, made of e.g. wood or tiles, and a sub-floor, where the water pipes are casted into concrete. Each of the heated floors has a control valve for hot water, that needs to be opened and closed such that the air temperature in room is kept close to the desired reference to ensure a high comfort.

For many years, the control of water-based floor heating systems has been based on relay controllers, which are flexible and simple. Typically each room is equipped with an independent relay controller that regulates the air temperature in the room by manipulating the control valve. Furthermore the inlet temperature of the hot water to the floor is regulated by a thermostat, thus indirectly assuring that the temperature in the top-floor does not exceed the material limitation (e.g. wooden floors can be destroyed) and the comfort criteria (that the floor does not get too hot). The major drawback, however, is that the control due to the large heat capacity of the concrete sub-floor and the limited upper inlet temperature of the water exhibits a very slow response and an extensive overshoot in the air temperature.

Motivated by these difficulties, we present a novel control for increasing the dynamic performance. We propose a cascaded control structure with an inner loop that controls the temperature of the sub-floor (concrete) and an outer loop that controls the air temperature in the room. The control problem is however significantly complicated by the fact that the temperature in the sub-floor is distributed and hard to measure, and the control valves are restricted to discrete values (open/closed). To accommodate these control difficulties a novel approach for estimating and controlling the sub-floor temperature is presented. This strategy removes overshoot and allows a higher inlet temperature of the hot water hence decreasing the air temperature response time.

The paper is structured in the following way. Section II describes the basic layout of a typical water-based floor heating system and the used test system. Section III provides an overview of the traditional control setup and the control objectives. Section IV summarizes the simplified model of the floor heating system and in Section V the model is validated against experimental data. In Section VI, the control strategy is formulated and a novel approach for controlling and estimating the sub-floor (concrete) temperature is proposed. In Section VII the proposed control scheme is implemented on the test system. Conclusions are drawn in Section VIII.

II SYSTEM DESCRIPTION

A typically water-based floor heating system can be divided into two parts; a water circuit and the heated floor and room. In the following we describe each of these parts.

A. Water Circuit

Figure 9:
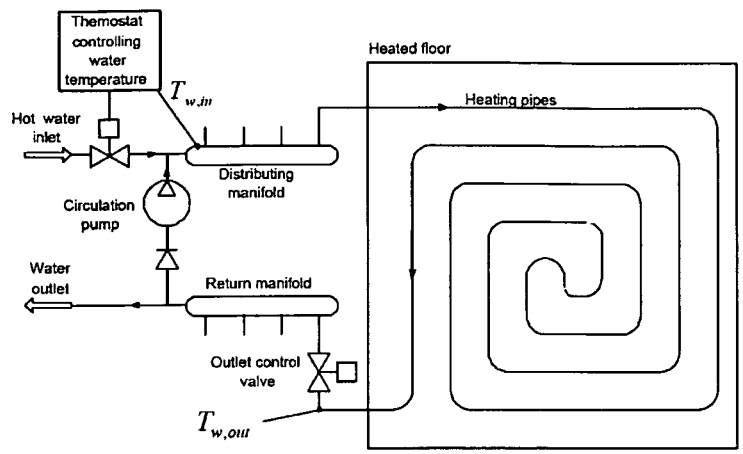
FIG. 9 illustrates an exemplary water circuit.

The water circuit supplies warm water to the heated floors by mixing the return water from the heated floors with an external supply of hot water, see FIG. 9. The redundant amount of cold water in the water circuit is released at the outlet of the return manifold.

The inlet temperature to the distributing manifold and hence to the heated floors ($T_{w;in}$) is controlled by a thermostatic valve that adjusts the amount of hot water mixed in the water circuit as shown in FIG. 9.

The inlet temperature to the floor is measured at the distributing manifold. The outlet temperature is measured just before the outlet valve.

B. Heated Floor and Room

The heated floor can be divided into a top-floor and a sub-floor. The sub-floor is typically made of concrete where the heating pipes are casted into. By supplying heated water ($\dot{Q}_W$) to the heating pipes the sub-floor is heated. The heat from the sub-floor is transmitted to the room through the top-floor ($\dot{Q}_f$), i.e. the top-floor can be regarded as a resistance in the heat transmission, see FIG. 10. The top-floor, which is placed on top of the sub-floor is made of e.g. wood or tiles etc.

Figure 10:
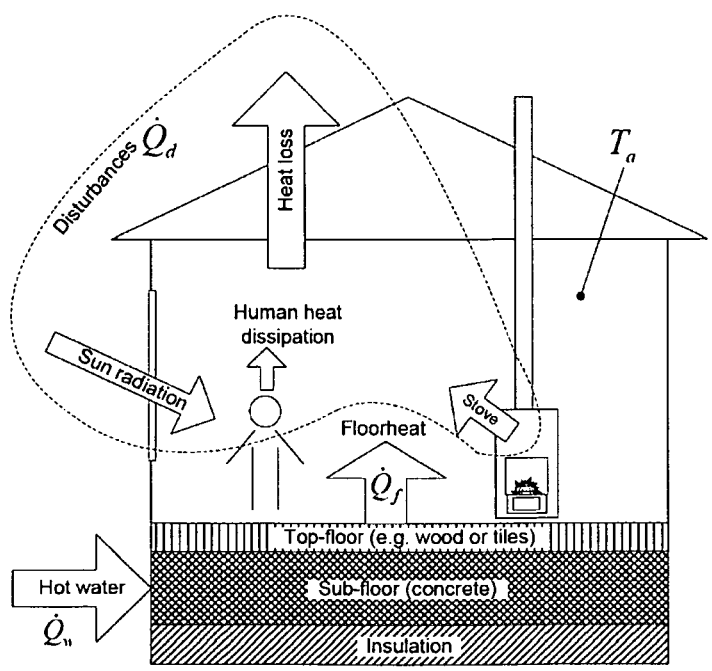
FIG. 10 illustrates an exemplary heated floor and room.

The room temperature (Ta) is measured by a temperature sensor mounted, typically on the wall of the room in question. This temperature measurement is used in the room temperature control. FIG. 10 furthermore depicts a number of possible disturbances to the temperature control. The experimental results are obtained on a test system having the features described above.

III CONTROL PROBLEM DESCRIPTION

The control challenges of a water-based floor heating system can be divided into two objectives, rejecting disturbances and following set-point. In most domestic houses the temperature set-point is fairly constant and only changed in relation to away periods, such as holidays. The objective after a set-point increase is as quickly as possible to get up to the new set-point without overshoot. Rejecting disturbances is the main day to day challenge. The outdoor climate is often treated as the sole disturbance, but additional heat sources and also water inlet temperature and pressure variations contribute to the disturbing factors. Climate disturbances are primarily outdoor temperature variations, but also wind and radiation play a role. Other disturbances can be in form of sun radiation through the window, a wood burning stove or human heat dissipation etc. (see FIG. 10).

Figure 11:
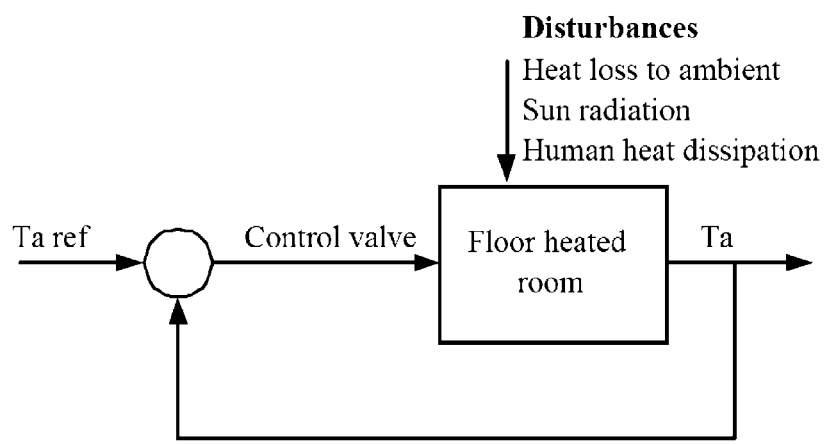
FIG. 11 illustrates a schematic of an exemplary floor heating system.

FIG. 11 shows the floor heating system as it is viewed from typical control systems, where the outlet valve is used as actuator, using the air temperature of the room directly as feedback for a relay type control. This approach contains some inherited problems. The main problem with regards to disturbances, is the large uncontrolled thermal capacity of the concrete floor which makes it difficult to compensate for outdoor climate variations and other heat-sources. The current relay approach wait for the inside temperature to fall below the set-point before the control valve is opened. The concrete sub-floor then has to increase the temperature to a level, where it can accommodate the increased heat load. This gives an undesired undershoot in temperature until the concrete temperature catches up. The same type of problem can appear in the early hours of the day, where the outdoor temperature increases fast. Sun radiation through the windows may even further decrease the heating demand very fast. Even when the control system closes the inlet valve when the inside temperature exceeds the set-point, the thermal capacity of the warm under-floor will still contribute to an increase of the room temperature. The severity of these problems greatly depends on the thermal resistance of the floor. A high thermal resistance floor type, such as a wooden floor requires a much higher sub-floor temperature to provide the needed heating compared to a low thermal resistance type (e.g. tiles). A wood floor also needs to respect a maximum temperature to ensure that the floor is not damaged. The wood floor producer Junckers Ltd. [1] recommends a maximum concrete temperature of 37.5° C., which in the current control structure limits the inlet temperature, and as a result of that also limits ability to change the concrete temperature fast.

IV MODELLING

The model focuses on the heated floor and the room. This part contains the slowest dynamic which poses the limitations to the dynamic performance of the control system. The dynamics of the water circuit is much faster than the heated floor and is therefore neglected and considered static.

Figure 12:
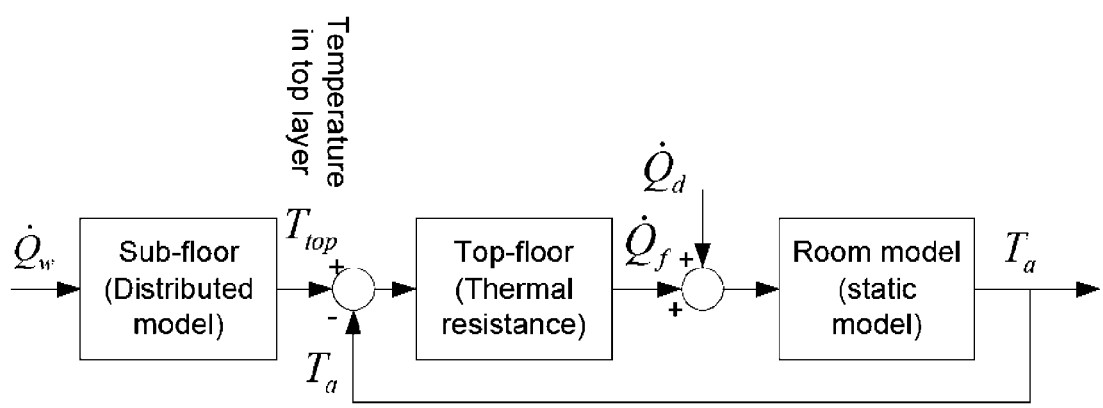
FIG. 12 illustrates an exemplary model of a heated floor and room.

The model of the floor and the heated room can be divided into 3 parts; the sub-floor, the top-floor and the room. These 3 parts are connected as depicted in FIG. 12.

The concrete sub-floor is heated by circulating hot water through the floor, i.e. by transmitting the heat $\dot{Q}_w$ from the water to the concrete. The temperature difference between the top-layer in sub-floor Ttop and the room temperature Ta drives the heat transmission $\dot{Q}_f$ from the sub-floor through the top-floor to the room. The room temperature is then determined by the heat received from the floor $\dot{Q}_f$ and the disturbances $\dot{Q}_d$.

In the following we will present the modelling of each of the 3 parts, depicted in FIG. 12.

A. The Sub-Floor

Figure 13:
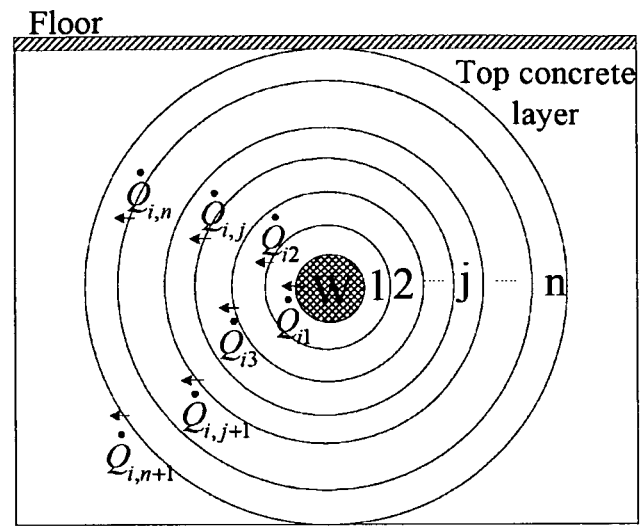
FIG. 13 illustrates an exemplary model of a temperature in a concrete layer in a radial direction from a heating pipe.
Figure 14:
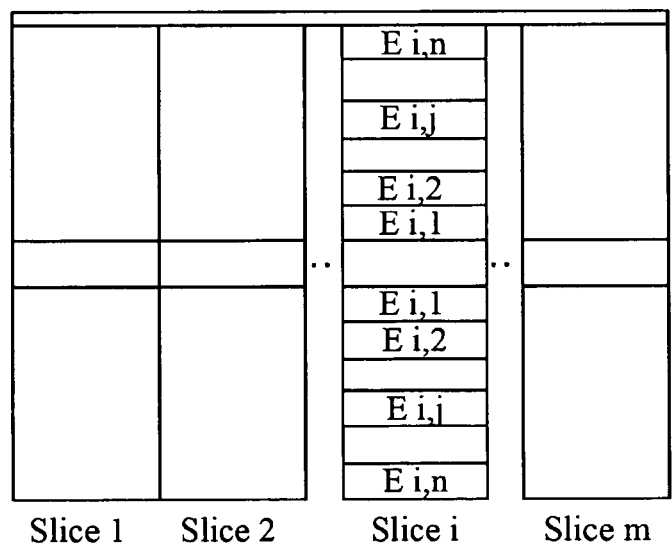
FIG. 14 illustrates an exemplary model of a temperature in the a concrete layer along a length of a heating pipe.

The relatively thick concrete layer, the low heat transfer from the concrete to the room and the low heat conduction in the concrete result in a high Biot number >>1, i.e. the concrete temperature can not be considered to be lumped, hence a distributed temperature model has to be used [2]. To simplify the modelling, the concrete sub-floor is divided into a number of volumes with a uniform temperature. As the temperature gradient changes in a radial direction from the heating pipes into the concrete, the concrete is divided into n+1 ring-shaped volumes with identical thicknesses L (see FIG. 13). The last "top layer" (number n+1) is not ring-shaped but still considered to have a uniform temperature. When the heat is transmitted from the water to the concrete, the water and concrete temperature drops along the pipe. This feature can be modelled by slicing the concrete sub-floor into m slices along the pipe, as depicted in FIG. 14.

However the transversal heat conduction between slices is neglected. Furthermore the "top concrete layer" in all of the slices is assumed to have the same temperature, i.e. it can be considered as one big piece. All in all this results in a 2 dimensional model as depicted in FIGS. 13 and 14.

In the following we will use the description Ei;j for the element located at jth layer in ith slice. This means that Ti;j is the temperature of the cylindrical concrete element (i; j) and $\dot{Q}i;j$ is heat flow from the cylindrical element (i; (j−1)) to (i; j), note that $\dot{Q}i;1$ is the heat flow from water pipe slice i to concrete layer (i; 1). Tw;in;i is the water inlet temperature of the ith pipe slice. Tw;out;i is the water outlet temperature of the ith pipe slice.

Using this notation the heat flow $\dot{Q}_{i,j}$ can be written as, $$\dot{Q}_{i,j} = \begin{cases} \frac{(T_{w,in,i} - T_{i,j})}{Rwc} & i = 1, 2 \ldots m, j = 1, \\ \frac{(T_{i,j-1} - T_{i,j}) \cdot K \cdot A_{i,j}}{L} & i = 1, 2 \ldots m, j = 2, 3 \ldots n, \\ \frac{(T_{i,j} - T_{top}) \cdot K \cdot A_{i,n+1}}{L} & i = 1, 2 \ldots m, j = n+1, \end{cases} \quad (1)$$

where Rwc is the thermal resistance from water to the concrete, Ai;j is the surface area between element (i; j−1) and (i; j) and, K is heat conductivity of concrete.

The total heat transmitted from water is given by $$\dot{Q}_w = \sum_{i=1}^{m} \dot{Q}_{i,1}$$

The temperature Ti;j can be determined as:

$$\frac{dT_{i,j}}{dt} = \frac{\dot{Q}_{i,j} - \dot{Q}_{i,j+1}}{C_{pc} \cdot m_{i,j}} \quad \text{where } i = 1, 2 \ldots m, j = 1, 2 \ldots n \quad (2)$$

Where Cpc is the specific heat capacity of concrete and mij is the mass of the element (i; j).

Since the top concrete layer is considered as a whole piece the temperature of this layer is assumed to be uniform, and hence it can be computed as, $$\frac{dT_{top}}{dt} = \frac{\sum_{i=1}^{m} \dot{Q}_{i,n+1} - \dot{Q}_{ca}}{C_{pc} \cdot m_{top}} \quad (3)$$

The temperature of the water out of slice i is $$\frac{dT_{w,out,i}}{dt} = T_{w,in,i} - \frac{\dot{Q}_{i,1}}{C_{pw} \cdot \dot{m}} \quad \text{where } i = 1, 2 \ldots m, \quad (4)$$

where Cpw is specific heat capacity of water, $\dot{m}$ is water mass flow and the inlet temperature of water to the ith slice Tw;in;i is given by, $$T_{w,in,i} = \begin{cases} T_{w,out,i-1} & i = 2, 3 \ldots m \\ T_{w,in} & i = 1 \end{cases} \quad (5)$$

where Tw;in is the inlet temperature of water to the floor and Tw;out=Tw;out;m is the outlet temperature from the floor.

B. The Top-Floor and the Room

The heat capacity of the top-floor is neglected as it is much smaller than that of the sub-floor. The energy flow from concrete to room through the top-floor is simply computed considering the top-floor as a heat resistance, i.e.

$$\dot{Q}_f = \frac{(T_{top} - T_a)}{R_{ca}}, \quad (6)$$

where Rca is the thermal resistance from top concrete layer to room air and Ta is the room temperature.

Finally the room temperature is computed, assuming a uniform temperature of the room (i.e. perfect mixing of the air) as follows, $$\frac{dT_a}{dt} = \frac{\dot{Q}_f - \dot{Q}_d}{C_{pa} m_a}, \quad (7)$$

where $\dot{Q}_d$ is the net heat loss from room to the ambient environment, Cpa is the specific heat capacity of air and, ma is the mass of the air inside the room.

Connecting the models as depicted in FIG. 12 gives the total model.

V MODEL VALIDATION

The model validation is carried out by comparing experimental data from the test floor heating system with the data from the mathematic model. The experiment is done in a test room of 16 m$^2$, which has 10 cm thick concrete sub-floor with a cast in water pipe 4 m per m$^2$.

Figure 15:
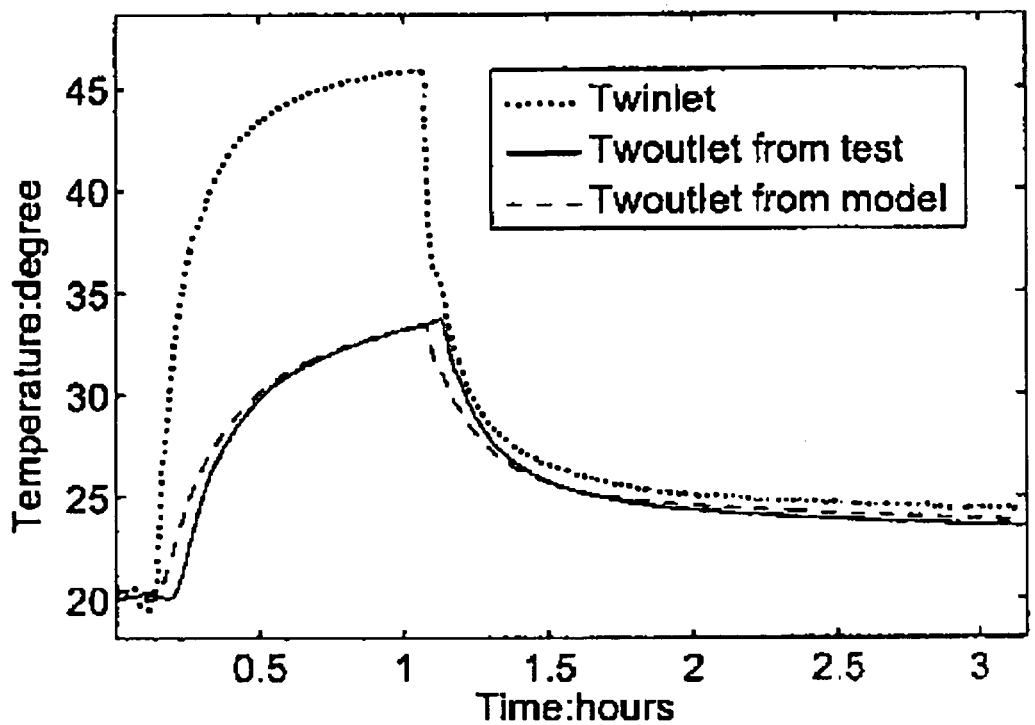
FIG. 15 illustrates a graph of an inlet temperature, a test outlet temperature and a model outlet temperature.

An experiment is conducted, where a 1 hour burst of hot water is led into the floor. Hereafter, the heating valve is switched off, and the water circulates through the floor without adding heat. In this way the outlet water temperature curve, the solid curve in FIG. 15, can be measured. The dotted curve is the water inlet temperature. By applying the same water inlet temperature and the same initial conditions to the model, the concrete temperature, the dashed curve, can be computed. By studying FIG. 15 it can be seen that the outlet water temperature from test system and the model are very close to each other. This shows that the model gives a very good description of the temperature propagation in the real floor system, as the outlet temperature of the water equals the warmest layer in the concrete.

Figure 16:
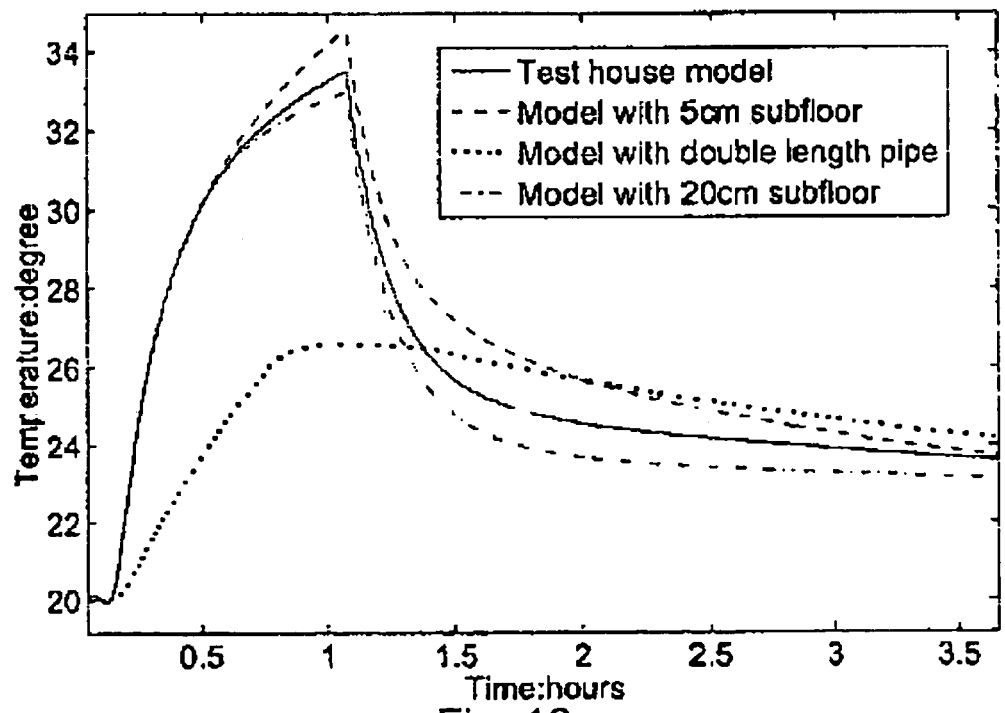
FIG. 16 illustrates a graph of a test outlet temperature and various model outlet temperatures.

FIG. 16 shows how the outlet water temperature reacts when the floor design parameters of the same house is changed in the model, when conducting the same experiment as described above. This is in an effort to investigate what will happen to the characteristics of the floor heating system, when the thickness of the sub-floor and the length of the heating pipes are changed. For a house of 16 m$^2$ with concrete sub-floor and wooded top-floor, in theory, the water outlet temperature from a 5 cm and 10 cm concrete sub-floor should be the same in the first period of the experiment, when bursting hot water into the floor. When the heat "wave" in the 5 cm sub-floor reaches the surface of the concrete, after approximately 0.5 hours, the overall concrete temperature starts to increase faster than in the 10 cm sub-floor. This is because the large thermal resistance of the wooden top-floor largely prevents heat transmission to the room. When heat burst stops, the outlet temperatures from both systems drop down, however after approximately 4.5 hour the outlet temperature form 5 cm sub-floor will be lower than the temperature from 10 cm sub-floor because of the smaller heat capacity.

For the same house, if there is a double length water pipe casted into the sub-floor (8 m per m$^2$), the water outlet temperature should be lower comparing to the house with 4 m per m$^2$. This is because the heat transfer from the water to the concrete is twice as good, hence more heat is transmitted to the sub-floor. When the heat burst stops, the outlet water temperature decreases slower than the 4 m per m$^2$, because the distance between the pipes is smaller and the temperature therefore equalizes faster in the concrete.

The results from the mathematic model, shown in FIG. 16, gave a good insight on how the various design parameters of the sub-floors alter the behaviour of the temperature propagation in the floor. This information is useful later on when the generality of the proposed control strategy is discussed.

VI NOVEL CONTROL APPROACH

Figure 17:
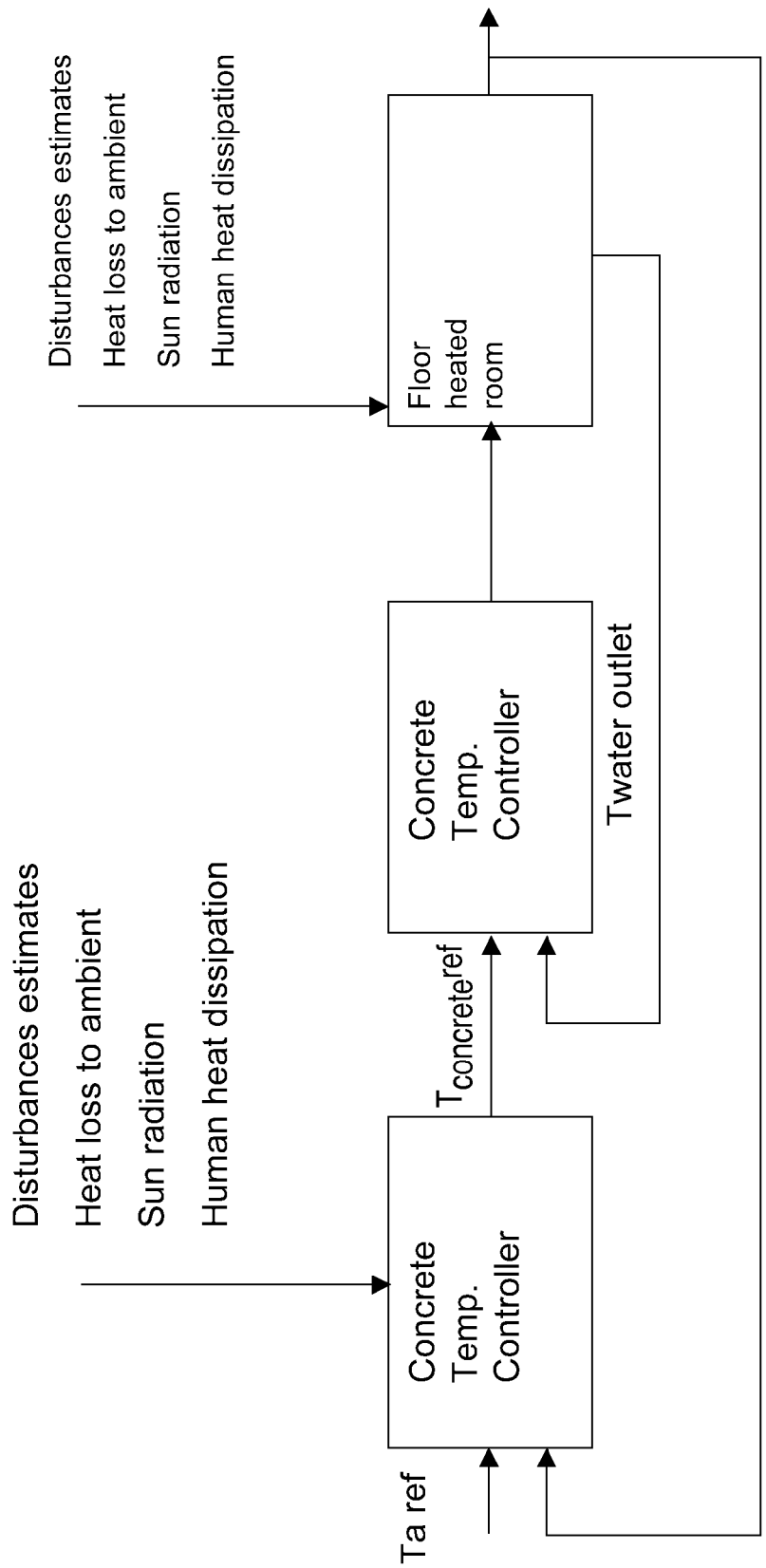
FIG. 17 illustrates a diagram of an exemplary control strategy.

The proposed control strategy depicted in FIG. 17 aims at dividing the control problem into two parts, an inner loop that maintains a desired concrete temperature, and an outer loop that controls the room temperature.

The overall strategy can be formulated by the repeated three steps

Estimate the current concrete temperature $\hat{T}$ concrete(t)
Calculate heat burst Qburst that will bring the concrete temperature up to set-point.
Apply the needed heat
Estimating the Concrete Temperature To install a temperature sensor in the concrete layer has proven impractical for a number of reasons. Firstly, a sensor placed in the concrete layer is hard to service and replace, especially with a wooden floor on top. Secondly, the placement of the sensor is very important. If it is placed close to the water pipes it will react very fast to the heating. If it is placed in the middle between two heat pipes, it would not react until the heat gradients reach the place furthest away from the water pipe.

The control application could make use of two estimates, a temperature that describes the heat conducted to the room (Ttop), and a maximum concrete surface temperature, which is important to limit with wooden floors.

We propose to use the water temperature to estimate the concrete temperature. After an idle period without heating, the water and the concrete equalize temperature. If we measure the water temperature after such an idle period, the measurement will reflect the warmest place of the concrete that is closest to the water pipes. With an increased idle period the temperature gradients in the concrete become smaller and we will obtain a lower temperature measurement as illustrated with the temperature curve after the heating burst in FIG. 15.

B. Estimating the Concrete Heat Capacity

We propose an experimental based approach that gives a "dynamic" heat capacity of the concrete. The main idea is to perform an experiment where we add a known amount of heat in a burst Qburst and measure the temperature increase ΔTconcrete. The heat capacity Cpconcrete can then be calculated as $$Cp_{concrete} = \frac{Q_{burst}}{\Delta T_{concrete}}. \quad (8)$$

Figure 18:
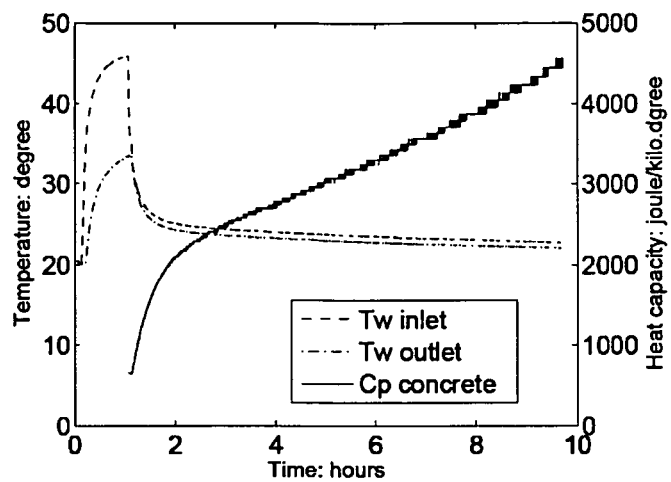
FIG. 18 illustrates a graph of an inlet temperature, an outlet temperature and a concrete heat capacity in an experimental setup.

FIG. 18 illustrates such an experiment performed on our test setup. In the initial phase after the heating burst (from t=68 min) the water temperature drops fast. After the initial phase, the temperature decay becomes much smaller, which reflects that the temperature gradient goes from a radial phase to a transversal phase. We can extend Equation 9 to give a dynamic heat capacity $$\hat{C}p(t) = \frac{Q_{burst}}{\Delta T_{water}(t)}, \quad (9)$$

which is illustrated in the second axis of FIG. 18. Hence the dynamic heat capacity $\hat{C}p(t)$ value describes the level of equalization and not the actual heat capacity of the concrete floor.

The temperature distribution in the concrete, where the layers closest to the water pipes are the warmest, ensures that the estimate of the dynamic heat capacity is always smaller than the real heat capacity.

VII RESULTS

Here are some experimental results from August $1^{st}$ with the novel control strategy which is aimed to control the concrete temperature, and so the room temperature. The experiment was started with a cold floor (23.5° C.) and an outdoor temperature about 17° C. The room temperature set-point was set to 23.5 degree for the duration of the experiment.

Figure 19:
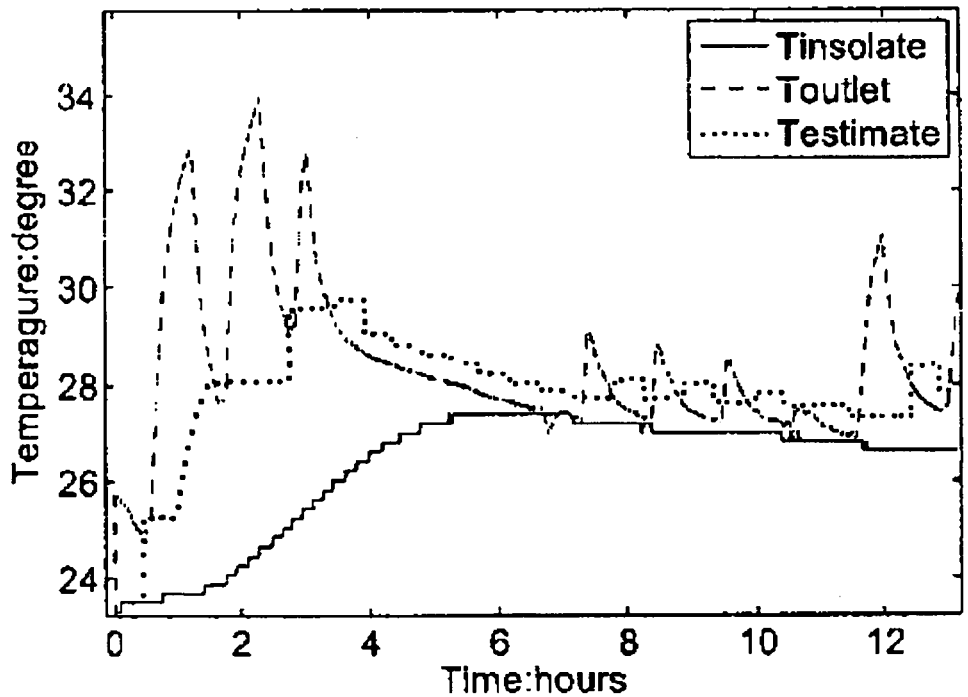
FIG. 19 illustrates a graph of an outlet temperature, a concrete estimate temperature and an isolated floor temperature.

FIG. 19 shows the water outlet temperature, concrete estimate temperature and isolated floor temperature. The isolated floor temperature is obtained by placing the thermal meter between the floor and insulation material. In steady state, the measured temperature is very close to the concrete top layer temperature. The concrete temperature is obtained by using the proposed method in Section VI. We can see that at the beginning, the top layer concrete temperature is increasing when there is big temperature gradient, and later, the top layer concrete is following the estimate temperature nicely, when there is a small gradient. Since the top layer concrete temperature is lower than the mean temperature of the sub floor, there is a temperature gradient between the top layer concrete temperature and the estimate temperature.

Figure 20:
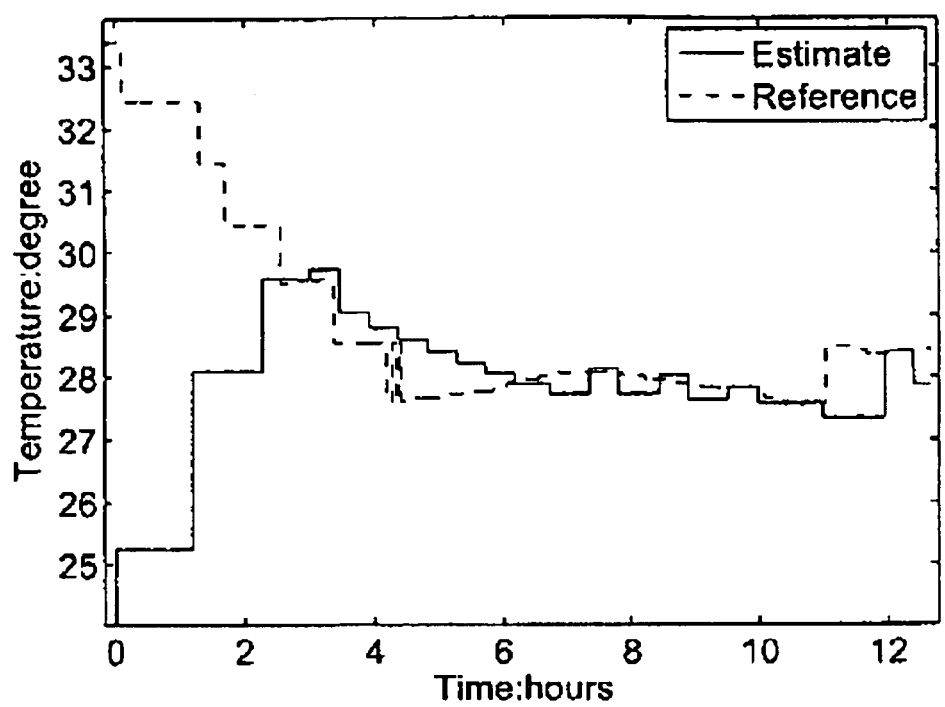
FIG. 20 illustrates a graph of a concrete reference temperature and an estimated temperature.

FIG. 20 shows the concrete reference temperature and the estimated temperature. At the beginning, when the reference is much higher than the estimated temperature, the concrete temperature increases fast, but the concrete temperature control block is limited to give the amount of energy that increases concrete temperature 3 degree. Later when the reference temperature is lower than the estimated temperature, the heating stops and the concrete temperature drops until it is lower than reference temperature and heating is started again. In this state, the reference and the estimated temperature are very close to each other which shows that the concrete temperature can be controlled.

Figure 21:
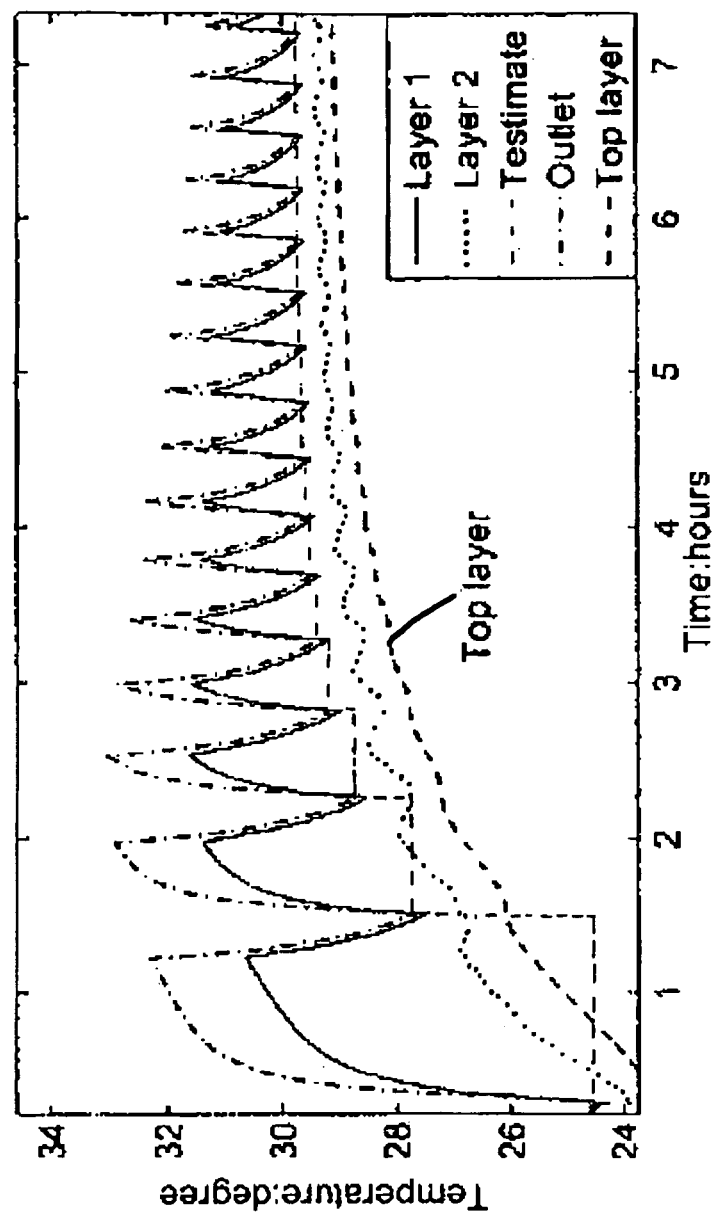
FIG. 21 illustrates a graph of a temperature distribution of a concrete floor.

FIG. 21 shows the temperature distribution of the concrete floor in the above experiment. This experiment is to maintain the concrete floor at 30 degree by opening and closing the floor heating circuit. We can see the temperature distribution in different layers. Concrete layer 1 is the closest layer to water pipe. Concrete layer 2 is further away from the water pipe than layer 1. Top layer is adjacent to the floor which can be seen in FIG. 13.

VIII CONCLUDING REMARKS

The objective of this paper was to present and evaluate a proposed control strategy for controlling the temperature in a water-based floor heating system. The inherited problems with the current strategy were discussed and a finite element type of model of the concrete floor was defined and validated with experimental data. The proposed strategy—a cascaded setup—was presented and validated by applying it to a real application. Simulation results elaborate the experimental results by demonstrating how the different layers of the concrete respond to the control approach. The main conclusion is that the control scheme is capable of controlling the concrete temperature in a fast and precise way without overshoot. Hence, it is possible to estimate the concrete temperature using the return water temperature.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for controlling a thermally convective system in which a fluid exchanges thermal energy with a medium, said method comprising:
    providing a flow of the fluid through the medium,
    using a controller to determine an induced heat by adding up a plurality of differences between an inlet temperature of the fluid when it enters the medium and an outlet temperature of the fluid when it leaves the medium, the temperatures being sampled with a fixed sampling time within a fixed period of time,
    using a controller to determine a $\Delta T_{MEDIUM}$ corresponding to a change in temperature of the medium over the said fixed period of time
    using a controller to provide a ratio between the induced heat and the $\Delta T_{MEDIUM}$ corresponding to the change in temperature of the medium, and
    using the ratio with the controller to control the temperature of the medium.

2. The method according to claim 1, and further comprising:
    determining a difference between a desired temperature and an actual temperature of the medium,
    providing from the determined difference and the ratio between the induced heat and the change in temperature, a necessary heat which is required to raise the temperature of the medium from the actual temperature to the desired temperature,
    providing a flow of the fluid through the medium while determining an induced heat by adding up a plurality of differences between the inlet temperature of the fluid and the outlet temperature of the fluid, the temperatures being sampled with the fixed sampling time, and
    determining when the induced heat corresponds to the necessary heat.

3. The method according to claim 1, wherein the temperature of the medium is determined by measuring a temperature of the fluid after a period of time without a fluid flow.

4. A floor healing system comprising:
    a conduit embedded in a floor for providing a fluid flow through the floor, the conduit being provided with an inlet with a first temperature measuring structure for measuring an inlet temperature of the fluid and an outlet with a second temperature sensing structure for measuring an outlet temperature of the fluid,
    means for circulating the fluid in the conduit, and
    processing means adapted to:
        control the fluid flow through the floor,
        determine an induced heat by adding up a plurality of differences between the inlet temperature of the fluid and the outlet temperature of the fluid, the temperatures being sampled with a fixed sampling time within a fixed period of time,
        determine a $\Delta T_{FLOOR}$ corresponding to a change in temperature of the floor over said fixed period of time,
        provide a ratio between the induced heat and the $\Delta T_{FLOOR}$ corresponding to the change in temperature of the floor, and
        use the ratio to control the temperature of the floor.

5. The system according to claim 4, wherein the processing means is further adapted to determine a desired thermal energy supply from the floor to the ambience, and based on the desired supply, to determine a desired temperature of the floor.

6. The system according to claim 4, comprising a plurality of loops connected in parallel between the inlet and outlet, wherein each loop is independently connectable to a fluid flow between the inlet and outlet to enable control of induced heat in each of the loops individually.

* * * * *